US008075833B2

(12) United States Patent  (10) Patent No.: US 8,075,833 B2
Kelley  (45) Date of Patent: Dec. 13, 2011

(54) METHOD AND APPARATUS FOR MANUFACTURING BLOW MOLDED CONTAINERS

(75) Inventor: Paul Kelley, Wrightsville, PA (US)

(73) Assignee: Graham Packaging Company L.P., York, PA (US)

( * ) Notice: Subject to any disclaimer, the term of this patent is extended or adjusted under 35 U.S.C. 154(b) by 1102 days.

(21) Appl. No.: 11/362,416

(22) Filed: Feb. 27, 2006

(65) Prior Publication Data

US 2006/0231985 A1  Oct. 19, 2006

Related U.S. Application Data

(60) Provisional application No. 60/671,459, filed on Apr. 15, 2005.

(51) Int. Cl.
B29C 49/08 (2006.01)
B29C 49/30 (2006.01)
(52) U.S. Cl. .................. 264/534; 264/531; 425/522
(58) Field of Classification Search .................. 264/534, 264/531, 530, 529, 532; 425/525, 529, 530, 425/522; 215/376, 377
See application file for complete search history.

(56) References Cited

U.S. PATENT DOCUMENTS

| 1,499,239 | A | 6/1924 | Malmquist |
|---|---|---|---|
| 2,142,257 | A | 1/1937 | Saeta |
| D110,624 | S | 7/1938 | Mekeel, Jr. |
| 2,124,959 | A | 7/1938 | Vogel |
| 2,378,324 | A | 6/1945 | Ray et al. |
| 2,880,902 | A | 4/1959 | Owsen |
| 2,960,248 | A | 11/1960 | Kuhlman |
| 2,971,671 | A | 2/1961 | Shakman |
| 2,982,440 | A | 5/1961 | Harrison |
| 3,043,461 | A | 7/1962 | Glassco |
| 3,081,002 | A | 3/1963 | Tauschinski et al. |
| 3,090,478 | A | 5/1963 | Stanley |
| 3,142,371 | A | 7/1964 | Rice et al. |
| 3,174,655 | A | 3/1965 | Hurschman |
| 3,198,861 | A | 8/1965 | Marvel |
| 3,301,293 | A | 1/1967 | Santelli |
| 3,325,031 | A * | 6/1967 | Singier .................. 215/247 |
| 3,397,724 | A | 8/1968 | Bolen et al. |
| 3,409,167 | A | 11/1968 | Blanchard |
| 3,417,893 | A | 12/1968 | Lieberman |
| 3,426,939 | A | 2/1969 | Young |
| 3,468,443 | A | 9/1969 | Marcus |

(Continued)

FOREIGN PATENT DOCUMENTS

AU 2002257159 B2 4/2003

(Continued)

OTHER PUBLICATIONS

Merriam-Webster OnLine Dictionary, http://www.merriam-webster.com/dictionary/substantially, 2 pages.*

(Continued)

Primary Examiner — Philip Tucker
Assistant Examiner — William Bell
(74) Attorney, Agent, or Firm — Miles & Stockbridge P.C.

(57) ABSTRACT

A method for forming a container includes receiving a parison, enclosing the parison with a mold that includes a cavity, and inflating the parison in said mold to form a blow molded container with a moveable region at the cavity. The method further includes repositioning the moveable region before filling the blow molded container.

18 Claims, 11 Drawing Sheets

U.S. PATENT DOCUMENTS

| | | |
|---|---|---|
| 3,483,908 A | 12/1969 | Donovan |
| 3,485,355 A | 12/1969 | Stewart |
| 3,693,828 A | 9/1972 | Kneusel et al. |
| 3,704,140 A | 11/1972 | Petit et al. |
| 3,727,783 A | 4/1973 | Carmichael |
| 3,819,789 A | 6/1974 | Parker |
| 3,904,069 A | 9/1975 | Toukmanian |
| 3,918,920 A | 11/1975 | Barber |
| 3,935,955 A | 2/1976 | Das |
| 3,941,237 A | 3/1976 | MacGregor, Jr. |
| 3,942,673 A | 3/1976 | Lyu et al. |
| 3,949,033 A | 4/1976 | Uhlig |
| 3,956,441 A | 5/1976 | Uhlig |
| 4,036,926 A | 7/1977 | Chang et al. |
| 4,037,752 A | 7/1977 | Dulmaine et al. |
| 4,117,062 A | 9/1978 | Uhlig |
| 4,123,217 A | 10/1978 | Fischer et al. |
| 4,125,632 A | 11/1978 | Vosti et al. |
| 4,134,510 A | 1/1979 | Chang |
| 4,158,624 A | 6/1979 | Ford et al. |
| 4,170,622 A | 10/1979 | Uhlig |
| 4,170,662 A | 10/1979 | Uhlig et al. |
| 4,174,782 A | 11/1979 | Obsomer |
| 4,219,137 A | 8/1980 | Hutchens |
| 4,231,483 A | 11/1980 | Dechenne et al. |
| 4,247,012 A | 1/1981 | Alberghini |
| 4,301,933 A | 11/1981 | Yoshino et al. |
| 4,318,489 A | 3/1982 | Snyder et al. |
| 4,318,882 A | 3/1982 | Agrawal et al. |
| 4,338,765 A | 7/1982 | Ohmori et al. |
| 4,355,728 A | 10/1982 | Yoshino et al. |
| 4,377,191 A | 3/1983 | Yamaguchi |
| 4,378,328 A | 3/1983 | Przytulla et al. |
| 4,381,061 A | 4/1983 | Cerny et al. |
| D269,158 S | 5/1983 | Gaunt et al. |
| 4,386,701 A | 6/1983 | Galer |
| 4,436,216 A | 3/1984 | Chang |
| 4,444,308 A | 4/1984 | MacEwen |
| 4,450,878 A | 5/1984 | Takada et al. |
| 4,465,199 A | 8/1984 | Aoki |
| 4,497,855 A | 2/1985 | Agrawal et al. |
| 4,525,401 A | 6/1985 | Pocock et al. |
| 4,542,029 A | 9/1985 | Caner et al. |
| 4,610,366 A | 9/1986 | Estes et al. |
| 4,628,669 A | 12/1986 | Herron et al. |
| 4,642,968 A | 2/1987 | McHenry et al. |
| 4,645,078 A | 2/1987 | Reyner |
| 4,667,454 A | 5/1987 | McHenry et al. |
| 4,684,025 A | 8/1987 | Copland et al. |
| 4,685,273 A | 8/1987 | Caner et al. |
| D292,378 S | 10/1987 | Brandt et al. |
| 4,723,661 A | 2/1988 | Hoppmann et al. |
| 4,724,855 A | 2/1988 | Jackson |
| 4,747,507 A | 5/1988 | Fitzgerald et al. |
| 4,749,092 A | 6/1988 | Sugiura et al. |
| 4,769,206 A | 9/1988 | Reymann et al. |
| 4,773,458 A | 9/1988 | Touzani |
| 4,785,949 A | 11/1988 | Krishnakumar et al. |
| 4,785,950 A | 11/1988 | Miller et al. |
| 4,807,424 A | 2/1989 | Robinson et al. |
| 4,813,556 A | 3/1989 | Lawrence |
| 4,831,050 A | 5/1989 | Bettle |
| 4,836,398 A | 6/1989 | Leftault, Jr. et al. |
| 4,840,289 A | 6/1989 | Fait et al. |
| 4,850,493 A | 7/1989 | Howard, Jr. |
| 4,850,494 A | 7/1989 | Howard, Jr. |
| 4,865,206 A | 9/1989 | Behm et al. |
| 4,867,323 A | 9/1989 | Powers |
| 4,880,129 A | 11/1989 | McHenry et al. |
| 4,887,730 A | 12/1989 | Touzani |
| 4,892,205 A | 1/1990 | Powers et al. |
| 4,896,205 A | 1/1990 | Weber |
| 4,921,147 A | 5/1990 | Poirier |
| 4,962,863 A * | 10/1990 | Wendling et al. ............ 220/649 |
| 4,967,538 A | 11/1990 | Leftault, Jr. et al. |
| 4,978,015 A | 12/1990 | Walker |
| 4,997,692 A | 3/1991 | Yoshino |
| 5,004,109 A | 4/1991 | Bartley et al. |
| 5,005,716 A | 4/1991 | Eberle |
| 5,014,868 A | 5/1991 | Wittig et al. |
| 5,024,340 A | 6/1991 | Alberghini et al. |
| 5,033,254 A | 7/1991 | Zenger |
| 5,060,453 A | 10/1991 | Alberghini et al. |
| 5,067,622 A | 11/1991 | Garver et al. |
| 5,090,180 A | 2/1992 | Sörensen |
| 5,092,474 A | 3/1992 | Leigner |
| 5,122,327 A | 6/1992 | Spina et al. |
| 5,133,468 A | 7/1992 | Brunson et al. |
| 5,141,121 A | 8/1992 | Brown et al. |
| 5,178,290 A | 1/1993 | Ota et al. |
| 5,199,587 A | 4/1993 | Ota et al. |
| 5,199,588 A | 4/1993 | Hayashi |
| 5,201,438 A | 4/1993 | Norwood |
| 5,217,737 A | 6/1993 | Gygax et al. |
| 5,234,126 A | 8/1993 | Jonas et al. |
| 5,244,106 A | 9/1993 | Takacs |
| 5,251,424 A | 10/1993 | Zenger et al. |
| 5,255,889 A | 10/1993 | Collette et al. |
| 5,261,544 A | 11/1993 | Weaver, Jr. |
| 5,279,433 A | 1/1994 | Krishnakumar et al. |
| 5,281,387 A | 1/1994 | Collette et al. |
| 5,310,043 A | 5/1994 | Alcorn |
| 5,333,761 A | 8/1994 | Davis et al. |
| 5,341,946 A | 8/1994 | Valliencourt et al. |
| 5,392,937 A | 2/1995 | Prevot et al. |
| 5,411,699 A | 5/1995 | Collette et al. |
| 5,454,481 A | 10/1995 | Hsu |
| 5,472,105 A | 12/1995 | Krishnakumar et al. |
| 5,472,181 A | 12/1995 | Lowell |
| RE35,140 E | 1/1996 | Powers, Jr. |
| 5,484,052 A | 1/1996 | Pawloski et al. |
| 5,503,283 A | 4/1996 | Semersky |
| 5,543,107 A * | 8/1996 | Malik et al. .................. 264/529 |
| 5,593,063 A | 1/1997 | Claydon et al. |
| 5,598,941 A | 2/1997 | Semersky et al. |
| 5,632,397 A | 5/1997 | Fandeux et al. |
| 5,642,826 A | 7/1997 | Melrose |
| 5,672,730 A | 9/1997 | Cottman |
| 5,687,874 A | 11/1997 | Omori et al. |
| 5,690,244 A | 11/1997 | Darr |
| 5,704,504 A | 1/1998 | Bueno |
| 5,713,480 A | 2/1998 | Petre et al. |
| 5,730,314 A | 3/1998 | Wiemann et al. |
| 5,730,914 A | 3/1998 | Ruppman, Sr. |
| 5,735,420 A | 4/1998 | Nakamaki et al. |
| 5,737,827 A | 4/1998 | Kuse et al. |
| 5,758,802 A | 6/1998 | Wallays |
| 5,762,221 A | 6/1998 | Tobias et al. |
| 5,780,130 A | 7/1998 | Hansen et al. |
| 5,785,197 A | 7/1998 | Slat |
| 5,819,507 A | 10/1998 | Kaneko et al. |
| 5,829,614 A | 11/1998 | Collette et al. |
| 5,860,556 A | 1/1999 | Robbins, III |
| 5,887,739 A | 3/1999 | Prevot et al. |
| 5,888,598 A | 3/1999 | Brewster et al. |
| 5,897,090 A | 4/1999 | Smith et al. |
| 5,906,286 A | 5/1999 | Matsuno et al. |
| 5,908,128 A | 6/1999 | Krishnakumar et al. |
| D415,030 S | 10/1999 | Searle et al. |
| 5,971,184 A | 10/1999 | Krishnakumar et al. |
| 5,976,653 A | 11/1999 | Collette et al. |
| RE36,639 E | 4/2000 | Okhai |
| 6,065,624 A | 5/2000 | Steinke |
| 6,068,110 A | 5/2000 | Kumakiri et al. |
| 6,074,596 A * | 6/2000 | Jacquet ........................ 264/529 |
| 6,077,554 A | 6/2000 | Wiemann et al. |
| 6,105,815 A | 8/2000 | Mazda |
| 6,213,325 B1 | 4/2001 | Cheng et al. |
| 6,217,818 B1 | 4/2001 | Collette et al. |
| 6,228,317 B1 | 5/2001 | Cargile |
| 6,230,912 B1 | 5/2001 | Rashid |
| 6,277,321 B1 | 8/2001 | Vailliencourt et al. |
| 6,298,638 B1 | 10/2001 | Bettle |
| 6,375,025 B1 | 4/2002 | Mooney |
| 6,390,316 B1 | 5/2002 | Mooney |
| 6,413,466 B1 | 7/2002 | Boyd et al. |
| 6,439,413 B1 | 8/2002 | Prevot et al. |

| | | | | | | |
|---|---|---|---|---|---|---|
| 6,467,639 | B2 | 10/2002 | Mooney | GB | 781103 | | 8/1957 |
| 6,485,669 | B1 | 11/2002 | Boyd et al. | GB | 1 113 988 | | 5/1968 |
| 6,502,369 | B1 | 1/2003 | Andison et al. | GB | 2050919 | A | 1/1981 |
| 6,514,451 | B1 | 2/2003 | Boyd et al. | GB | 2372977 | A | 9/2002 |
| 6,585,124 | B2 | 7/2003 | Boyd et al. | JP | 48-31050 | | 9/1973 |
| 6,595,380 | B2 | 7/2003 | Silvers | JP | 49-28628 | | 7/1974 |
| 6,612,451 | B2 | 9/2003 | Tobias et al. | JP | 54-72181 | A | 6/1979 |
| 6,662,960 | B2 | 12/2003 | Hong et al. | JP | 56-72730 | U | 6/1981 |
| 6,749,780 | B2 | 6/2004 | Tobias | JP | 57-210829 | A | 1/1982 |
| 6,763,968 | B1 | 7/2004 | Boyd et al. | JP | 57-37827 | U | 2/1982 |
| 6,769,561 | B2 | 8/2004 | Futral et al. | JP | 57210829 | A * | 12/1982 |
| 6,779,673 | B2 | 8/2004 | Melrose et al. | JP | 63-189224 | A | 8/1988 |
| 6,923,334 | B2 | 8/2005 | Melrose et al. | JP | 63189224 | A * | 8/1988 |
| 6,942,116 | B2 | 9/2005 | Lisch et al. | JP | 3-43342 | A | 2/1991 |
| 6,983,858 | B2 | 1/2006 | Slat et al. | JP | 03-076625 | A | 4/1991 |
| 7,051,073 | B1 | 5/2006 | Dutta | JP | 5-193694 | | 8/1993 |
| 7,051,889 | B2 | 5/2006 | Boukobza | JP | 6-336238 | A | 12/1994 |
| D522,368 | S | 6/2006 | Darr et al. | JP | 07-300121 | A | 11/1995 |
| 7,073,675 | B2 | 7/2006 | Trude | JP | 8-253220 | A | 10/1996 |
| 7,077,279 | B2 | 7/2006 | Melrose | JP | 8-282633 | A | 10/1996 |
| 7,137,520 | B1 | 11/2006 | Melrose | JP | 09-039934 | A | 2/1997 |
| 7,150,372 | B2 | 12/2006 | Lisch et al. | JP | 9-110045 | A | 4/1997 |
| 7,159,374 | B2 | 1/2007 | Abercrombie, III et al. | JP | 09039934 | A | 10/1997 |
| 7,543,713 | B2 | 6/2009 | Trude et al. | JP | 10-167226 | A | 6/1998 |
| 7,735,304 | B2 | 6/2010 | Kelley et al. | JP | 10181734 | A | 7/1998 |
| 7,799,264 | B2 | 9/2010 | Trude | JP | 10230919 | A | 9/1998 |
| 2001/0035391 | A1 | 11/2001 | Young et al. | JP | 11-218537 | A | 8/1999 |
| 2002/0074336 | A1 | 6/2002 | Silvers | JP | 2000229615 | | 8/2000 |
| 2002/0096486 | A1 | 7/2002 | Bourque | JP | 2002-127237 | A | 5/2002 |
| 2002/0153343 | A1 | 10/2002 | Tobias et al. | JP | 2004-026307 | A | 1/2004 |
| 2002/0158038 | A1 | 10/2002 | Heisel et al. | JP | 2006-501109 | | 1/2006 |
| 2003/0015491 | A1 | 1/2003 | Melrose et al. | JP | 2007-216981 | A | 8/2007 |
| 2003/0186006 | A1 | 10/2003 | Schmidt et al. | NZ | 240448 | | 6/1995 |
| 2003/0196926 | A1 | 10/2003 | Tobias et al. | NZ | 296014 | | 10/1998 |
| 2003/0217947 | A1 | 11/2003 | Ishikawa et al. | NZ | 335565 | | 10/1999 |
| 2004/0016716 | A1 | 1/2004 | Melrose et al. | NZ | 506684 | | 9/2001 |
| 2004/0074864 | A1 | 4/2004 | Melrose et al. | NZ | 512423 | | 9/2001 |
| 2004/0149677 | A1 | 8/2004 | Slat et al. | NZ | 521694 | | 10/2003 |
| 2004/0173565 | A1 | 9/2004 | Semersky et al. | WO | WO 93/09031 | A1 | 5/1993 |
| 2004/0211746 | A1 | 10/2004 | Trude | WO | WO 93/12975 | A1 | 7/1993 |
| 2005/0211662 | A1 | 9/2005 | Eaton et al. | WO | WO 94/05555 | | 3/1994 |
| 2006/0006133 | A1 | 1/2006 | Lisch et al. | WO | WO 97/03885 | | 2/1997 |
| 2006/0138074 | A1 | 6/2006 | Melrose | WO | WO 97/14617 | | 4/1997 |
| 2006/0231985 | A1 | 10/2006 | Kelley | WO | WO 97/34808 | A1 | 9/1997 |
| 2006/0243698 | A1 | 11/2006 | Melrose | WO | WO 99/21770 | | 5/1999 |
| 2006/0255005 | A1 | 11/2006 | Melrose et al. | WO | WO 00/38902 | A1 | 7/2000 |
| 2006/0261031 | A1 | 11/2006 | Melrose | WO | WO 00/51895 | A1 | 9/2000 |
| 2007/0017892 | A1 | 1/2007 | Melrose | WO | WO 01/40081 | A1 | 6/2001 |
| 2007/0045312 | A1 | 3/2007 | Abercrombie, III et al. | WO | WO 02/02418 | A1 | 1/2002 |
| 2007/0051073 | A1 | 3/2007 | Kelley et al. | WO | WO 02/18213 | A1 | 3/2002 |
| 2007/0084821 | A1 | 4/2007 | Bysick et al. | WO | WO 02/085755 | A1 | 10/2002 |
| 2007/0125742 | A1 | 6/2007 | Simpson, Jr. et al. | WO | WO 2004/028910 | A1 | 4/2004 |
| 2007/0125743 | A1 | 6/2007 | Pritchett, Jr. et al. | WO | WO 2004028910 | A1 * | 4/2004 |
| 2007/0181403 | A1 | 8/2007 | Sheets et al. | WO | WO 2004/106176 | A2 | 9/2004 |
| 2007/0199915 | A1 | 8/2007 | Denner et al. | WO | WO 2004/106175 | A1 | 12/2004 |
| 2007/0199916 | A1 | 8/2007 | Denner et al. | WO | WO 2005/012091 | A2 | 2/2005 |
| 2007/0215571 | A1 | 9/2007 | Trude | WO | WO 2005/087628 | A1 | 9/2005 |
| 2007/0235905 | A1 | 10/2007 | Trude et al. | WO | WO 2006/113428 | A3 | 10/2006 |
| 2008/0047964 | A1 | 2/2008 | Denner et al. | WO | WO 2007/127337 | A2 | 11/2007 |
| 2008/0156847 | A1 | 7/2008 | Hawk et al. | | | | |
| 2009/0202766 | A1 | 8/2009 | Beuerle et al. | | | | |

FOREIGN PATENT DOCUMENTS

| | | |
|---|---|---|
| CA | 2077717 A1 | 3/1993 |
| DE | 1761753 | 1/1972 |
| DE | P2102319.8 | 8/1972 |
| DE | 3215866 A1 | 11/1983 |
| EP | 225155 A2 * | 6/1987 |
| EP | 0 346 518 A1 | 12/1989 |
| EP | 0521642 | 1/1993 |
| EP | 0 551 788 A1 | 7/1993 |
| EP | 0666222 A1 | 2/1994 |
| EP | 0 609 348 B1 | 2/1997 |
| EP | 0916406 A2 | 5/1999 |
| EP | 0957030 A2 | 11/1999 |
| EP | 1 063 076 A | 12/2000 |
| EP | 1063076 A1 * | 12/2000 |
| FR | 1571499 | 6/1969 |
| FR | 2607109 | 5/1988 |

OTHER PUBLICATIONS

"Application and Development of PET Plastic Bottle," Publication of Tsinghad Tongfang Optical Disc Co. Ltd., Issue 4, 2000, p. 41. (No English language translation available).

International Search Report for PCT/US06/014055 dated Dec. 7, 2006.

U.S. Appl. No. 60/220,326, filed Jul. 24, 2000.

Office Action for U.S. Appl. No. 10/558,284 dated Jan. 25, 2008.

Final Office Action for U.S. Appl. No. 10/558,284 dated Sep. 9, 2008.

Office Action for U.S. Appl. No. 10/566,294 dated Oct. 27, 2008.

Final Office Action for U.S. Appl. No. 10/851,083 dated Jun. 12, 2008.

Office Action for U.S. Appl. No. 10/851,083 dated Sep. 6, 2007.

First Notification of Office Action, Chinese App. No. 200680012360.7, Jul. 10, 2009.

International Search Report for PCT/US2005/008374 dated Aug. 2, 2005.

IPRP (including Written Opinion) for PCT/US2005/008374 dated Sep. 13, 2006.
Final Office Action for U.S. Appl. No. 10/566,294 dated Feb. 13, 2009.
International Search Report for PCT/US2004/024581 dated Jul. 25, 2005.
IPRP (including Written Opinion) for PCT/US2004/024581 dated Jan. 30, 2006.
IPRP (including Written Opinion) for PCT/US2004/016405 dated Nov. 25, 2005.
Office Action for Application No. EP 06 750 165.0-2307 dated Nov. 24, 2008.
International Search Report for PCT/US2006/040361 dated Feb. 26, 2007.
IPRP (including Written Opinion) for PCT/US2006/040361 dated Apr. 16, 2008.
International Search Report for PCT/US2007/006318 dated Sep. 11, 2007.
IPRP (including Written Opinion) PCT/US2007/006318 dated Sep. 16, 2008.
International Search Report for PCT/US2006/014055 dated Dec. 7, 2006.
IPRP (including Written Opinion) PCT/US2006/014055 dated Oct. 16, 2007.
Patent Abstracts of Japan; vol. 012, No. 464; Dec. 6, 1988.
Patent Abstracts of Japan; vol. 2002, No. 09, Sep. 4, 2002.
Patent Abstracts of Japan, vol. 015, No. 239, Jun. 20, 1991.
Chanda, M. & Roy, Salil K., Plastics Technology Handbook, 2007, CRC Press, pp. 2-34-2-37.

Office Action dated Aug. 5, 2010 for U.S. Appl. No. 11/399,430.
Final Office Action dated Feb. 22, 2010 for U.S. Appl. No. 11/399,430.
Office Action dated Sep. 4, 2009 for U.S. Appl. No. 11/399,430.
Office Action dated Jun. 19, 2009 for U.S. Appl. No. 11/399,430.
Examiner's First Report dated Sep. 18, 2009 for Application No. AU 2006236674.
Examiner's Report No. 2 dated Nov. 6, 2009 for Application No. AU 2006236674.
Notice of Acceptance dated Sep. 13, 2010 for Application No. AU 2006236674.
Requisition dated Feb. 3, 2010 for Application No. CA 2,604,231.
Notice of Allowance dated Jun. 22, 2009 for Application No. EP 06 750 165.0-2307.
Communication and European Search Report for Application No. EP 09173607.4-2307.
Examination Report dated Aug. 3, 2009 for Application No. NZ 563134.
Notice of Acceptance dated Nov. 16, 2009 for Application No. NZ 563134.
ISR and Written Opinion for PCT/US2010/020045 dated Mar. 15, 2010.
Final Office Action dated Jan. 14, 2011, U.S. Appl. No. 11/704,368.
Office Action dated Jul. 8, 2010, U.S. Appl. No. 11/704,368.
International Search Report and Written Opinion dated Sep. 8, 2009 for PCT/US2009/051023.
Office Action dated Feb. 2, 2011, U.S. Appl. No. 11/399,430.

* cited by examiner

METHOD AND APPARATUS FOR MANUFACTURING BLOW MOLDED CONTAINERS

The present application claims the benefit of U.S. Provisional Patent Application No. 60/671,459 filed Apr. 15, 2005, which is incorporated herein by reference in its entirety.

BACKGROUND OF THE INVENTION

1. Field of the Invention

The present invention relates generally to forming a blow molded container, and more particularly to a method for forming a blow molded container that increases orientation of material at a region of the blow molded container.

2. Related Art

Conventionally, a container may be manufactured through a process known as blow molding. In blow molding, a parison is received at a blow molding apparatus, and the parison is enclosed by a container mold. The blow molding apparatus inflates the parison by forcing gas into the parison which causes the parison to stretch and take the shape of the container mold. Once the parison has taken the shape of the container mold, the blow molding step is complete and the container is removed from the container mold for further processing.

In some applications of container manufacturing, a deep protrusion may be required at a particular section of a container, most often at a base or at a hand grip of the container. Deep protrusions, when located at the base of the container, are sometimes referred to as "push-ups" since the protrusions push up into the interior of the container. However, employing known techniques to manufacture containers with deep protrusions has various problems. One such problem is the orientation of the plastic material around the deep protrusion. Orientation refers to how closely the molecules in a plastic material are packed together. Orientation of plastic molecules occurs as the plastic material stretches, and the greater the material stretch, the higher the orientation. As the orientation of the plastic molecules increases, the molecules straighten and may form a crystalline structure. Typically, the higher the crystallinity of the plastic, the greater the rigidity of the plastic, which improves the structural integrity of the container. The structural integrity of the container may be important during hot fill processing as the container must be able to withstand the rigors of hot fill processing.

In a hot fill process, a product is added to the container at an elevated temperature, about 82° C., which can be near the glass transition temperature of the plastic material, and the container is capped. During hot fill processing and in the subsequent cooling, the container base may experience roll out, distortion, or deformation that can cause the container to lean or become unstable. This problem can be reduced or eliminated by increasing orientation of material in the container base.

During blow molding of a container, gas is forced into a parison which causes the parison to inflate and stretch to take the shape of the container mold. However, the parison cools as it contacts the container mold. Cooling of the parison affects its ability to stretch, and thus its ability to orient. While this may not cause problems for most sections of the container, it particularly affects the orientation of the material formed around a deep protrusion. As the parison contacts the deep protrusion, the parison must flow around the protrusion into a recess. As the parison contacts the protrusion and cools, the parison is less able to flow around the protrusion, which affects the ability of the parison to stretch and to orient plastic material at the recess. Insufficient orientation at a region, such as at a base or at a hand grip, may affect the ability of the region to maintain its shape around the protrusion, the strength of the region, or the ability of the container to stand on a flat surface. Cooling of the parison also is known to create thick amorphous plastic sections around the protrusion, which adds excess plastic material to the container and affects the rigidity around the protrusion. The thick amorphous plastic sections add to the weight of the container, and thus the cost.

A known system for manufacturing a blow molded container is described in U.S. Pat. No. 5,255,889 to Collette et al., which is incorporated herein by reference. In the system described therein, a preform is received and enclosed by a mold chamber, which includes two side movable mold members and a base mold. In the mold chamber, the base mold member has an upper base plug with a protrusion that extends upward toward the center of the mold chamber. During blow molding, gas is forced into the preform to inflate and stretch the preform material into the shape of the mold chamber. As the preform material reaches the protrusion, the material stretches around the protrusion into a recess to form a bearing surface of the container. Once the container is formed, the mold chamber (the two side mold members and the base mold member) opens and releases the molded container. However, the base of the containers generated by this system may have limited crystallinity, a build up of amorphous unoriented material, or other problems in the base similar to those described above due to forcing the preform to stretch around the protrusion into the recess to form the bearing surface of the container.

Likewise, FIG. 1 illustrates a base assembly 100 for forming a container base according to the prior art. The base assembly 100 includes a base pedestal 102, a centering pin 120, and a base plug 104, with the base plug 104 being secured to a top surface of the base pedestal 102. The centering pin 120 may be used to secure and position the base assembly in a blow molding apparatus (not shown). The base plug 104 includes a base mold 106 for forming a container base. The base mold 106 includes a protrusion 108 for forming a deep protrusion in the container base, and a surface 110 for forming a bearing surface of the container base.

During blow molding of a parison into a container, the base mold 106 forms the parison material into a base of the container. As the parison material contacts the base mold 106, the parison material stretches around the protrusion 108 down to the surface 110 for forming the bearing surface, as indicated by the arrows A and B. However, once the parison contacts the protrusion 108, the parison material begins to cool and the orientation of the parison material is slowed, which causes the formation of thick amorphous plastic sections in the base. The thick amorphous plastic sections affect the rigidity of the base, the ability of the container to stand on a flat surface, and add to the cost of the container.

What is needed is an improved system for forming a deep protrusion in a container that overcomes the shortcomings of conventional solutions.

BRIEF SUMMARY OF THE INVENTION

In summary, this invention differs from the prior art in modifications which were not previously known or suggested.

The invention includes a method for forming a container, a method for increasing crystallinity of a container, a base assembly for forming a container, and a container.

The method of the invention for forming a container includes receiving a parison, enclosing the parison with a mold having a cavity, inflating the parison in the mold to form a blow molded container with a moveable region at the cavity, and repositioning the moveable region before filling said blow molded container.

The method of the invention for increasing crystallinity of a container includes inflating a parison to form a blow molded container having a moveable region, at least a portion of the moveable region protruding outward from the blow molded container, and repositioning the moveable region before filling the blow molded container.

The base assembly of the invention, which is adapted to form a container with a base having a moveable region and having a bearing surface, includes a base pedestal, a push rod coupled to the base pedestal, and a base plug coupled to the base pedestal. The base plug has a base mold adapted to form the moveable region and to from the bearing surface of the base so that at least a portion of the moveable region protrudes outward from the base beyond the bearing surface. The push rod is adapted to reposition the moveable region before filling the container.

The container of the invention includes a base having a moveable region with a dimple, and a bearing surface that is offset from the moveable region. After blow molding and before filling the container, at least a portion of the moveable region protrudes outward beyond the bearing surface.

Further objectives and advantages, as well as the structure and function of preferred embodiments will become apparent from a consideration of the description, drawings, and examples.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention. All references cited herein are incorporated by reference as if each had been individually incorporated.

Figure 1:
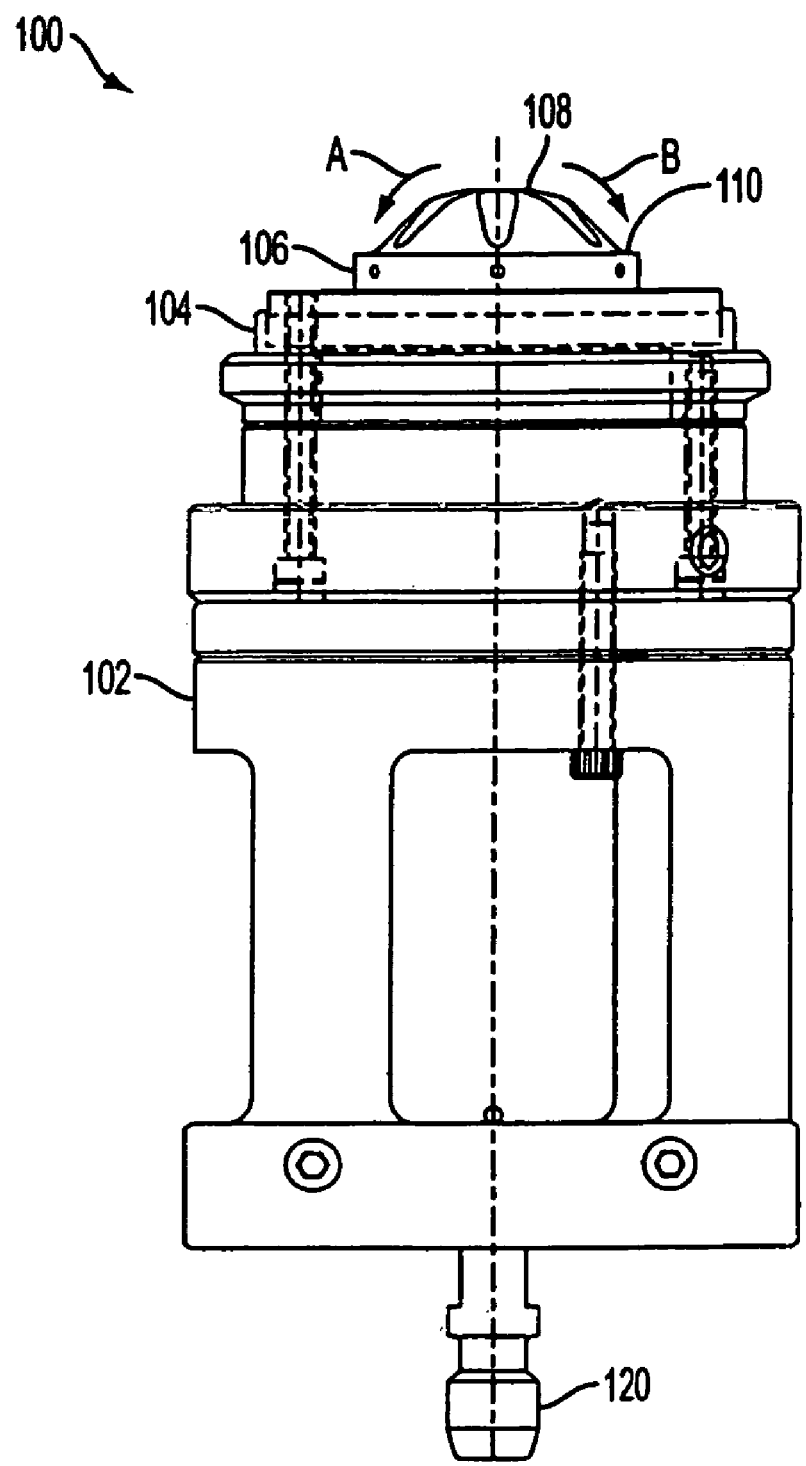
FIG. 1 illustrates a base assembly for forming a container base according to the prior art.
Figure 2A:
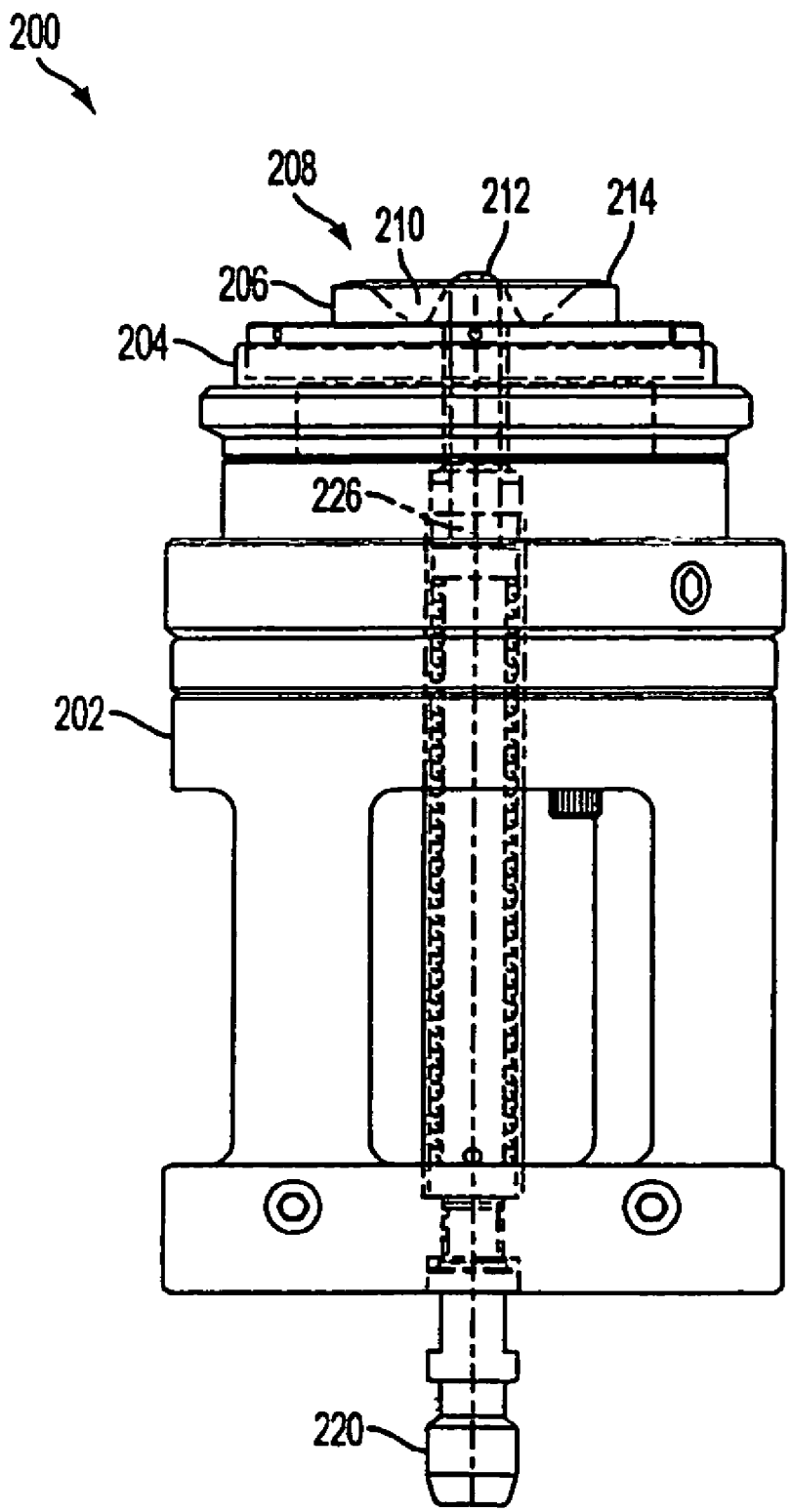
FIGS. 2A-2D illustrate an exemplary embodiment of a base assembly according to the present invention.
Figure 2B:
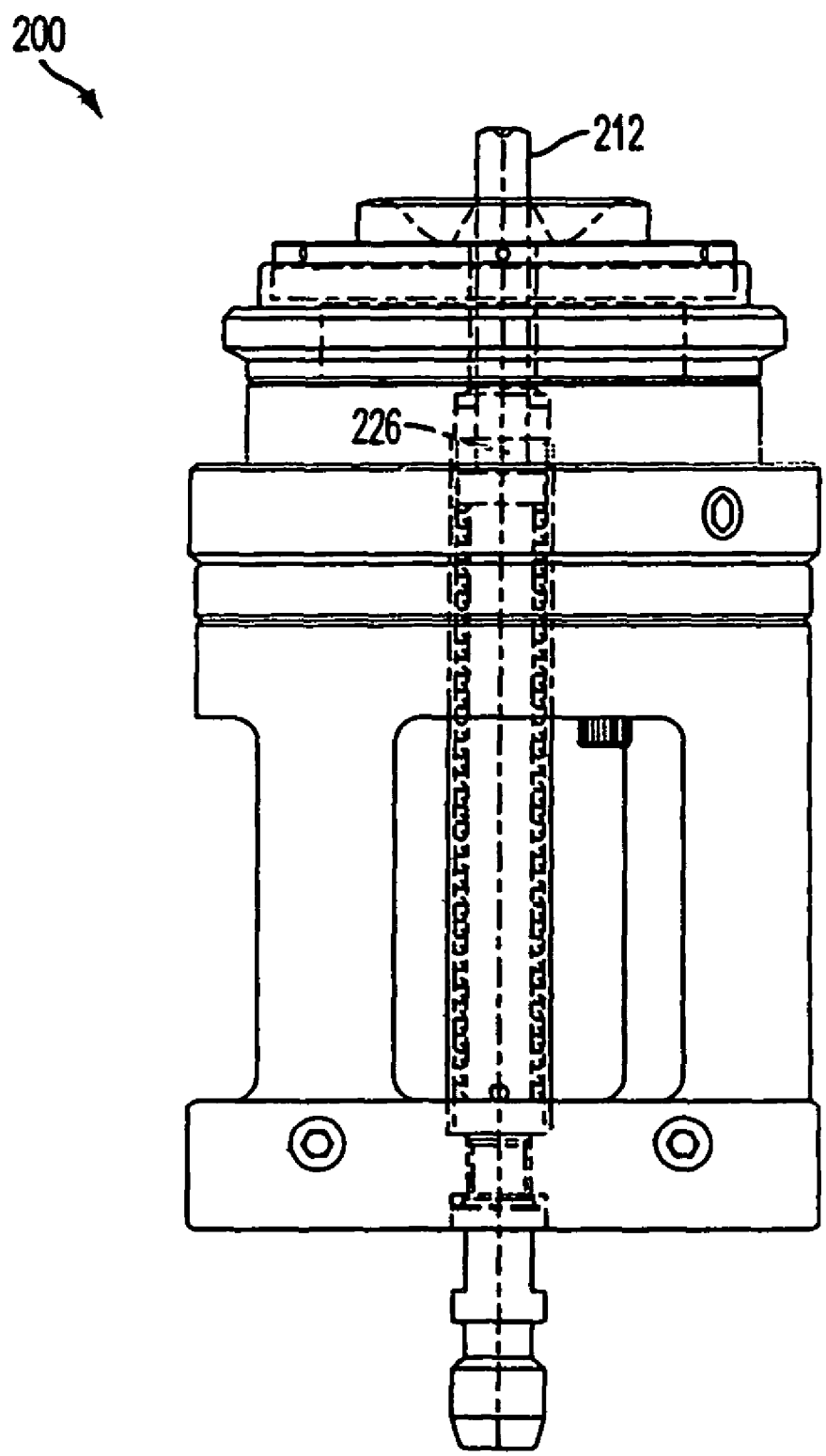
Figure 2C:
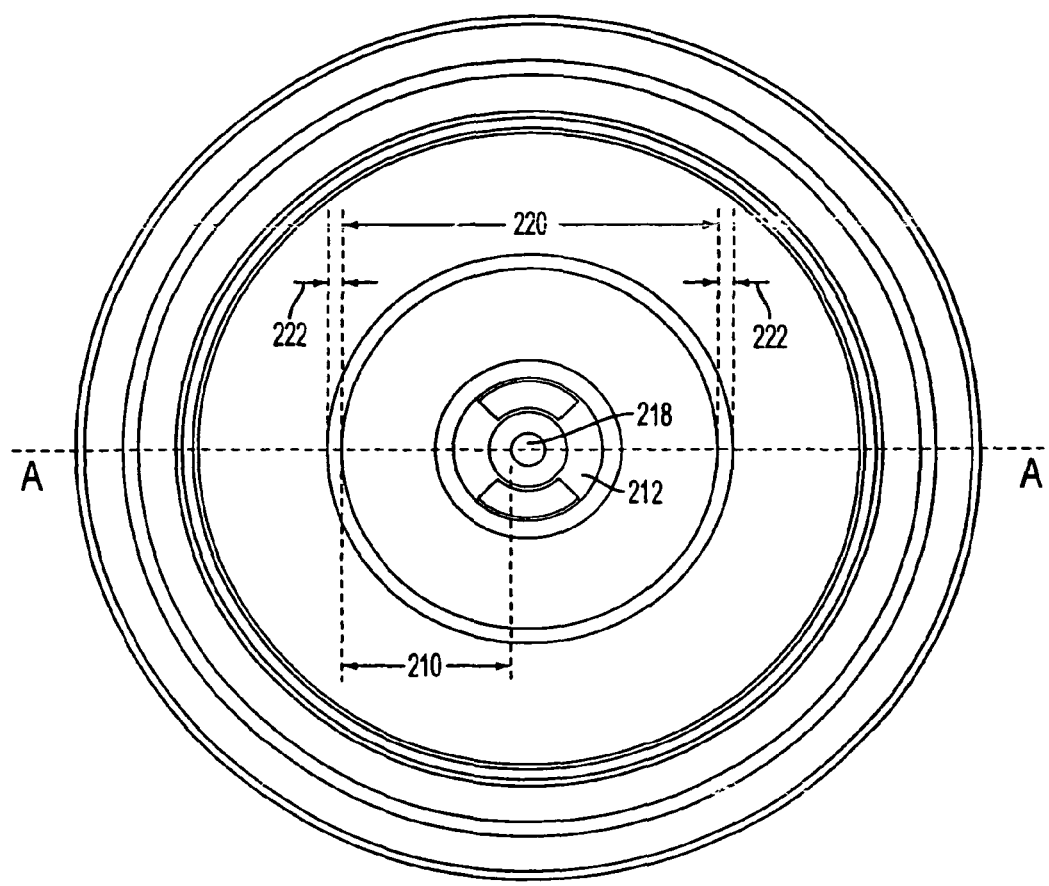
Figure 2D:
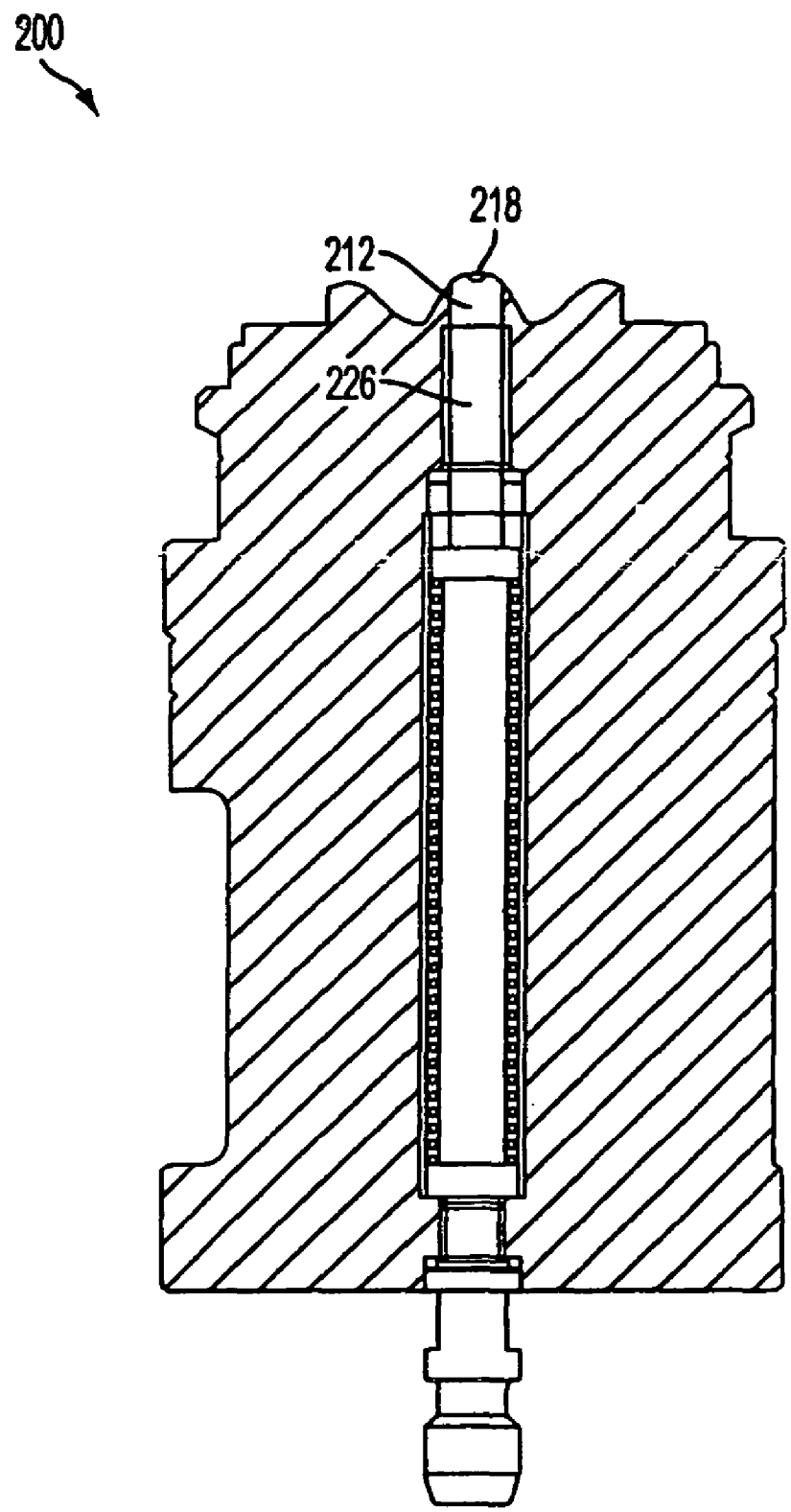

FIGS. 2A-2D illustrate an exemplary embodiment of a base assembly 200 according to the present invention. FIG. 2A illustrates a side view of the base assembly 200 having a push rod 226. FIG. 2B illustrates a side view of the base assembly 200 with a rod end 212 of the push rod 226 extended. FIG. 2C illustrates a top view of the base assembly 200. FIG. 2D illustrates a cross sectional view of the base assembly 200 along line A-A of FIG. 2C to further depict the push rod 226. In the following description, reference to FIGS. 2A-2D will be made.

The base assembly 200 includes a base pedestal 202, a base plug 204, a centering pin 220, and a push rod 226. The centering pin 220 may be used to secure and position the base assembly 200 in a blow molding apparatus (not shown). The base pedestal 202 may have any shape, so long as it has a hollow central region for receiving the push rod 226, and a top region adapted to connect with the base plug 204. In an alternative embodiment, the base plug 204 and the base pedestal 202 may be a single apparatus. During blow molding, the base assembly 200 is raised to connect with other mold assemblies for blow molding of a container. After the container is blow molded, the base assembly 200 is lowered to release the container.

The push rod 226 is a cylindrically shaped rod that is located above the centering pin 220 and extends through the base pedestal 202 up to a surface of the base plug 204. In one embodiment, the push rod 226 is a metal mold component. The base assembly 200 includes a mechanism that moves the push rod 226 and elevates a rod end 212 of the push rod 226 above the surface of the base plug 204. In an alternative embodiment, only the rod end 212 of the push rod 226 may be elevated. The mechanism for elevating the push rod 226 may be a spring, a cam, or may be driven pneumatically, hydraulically, or electronically. The mechanism may be located internal or external to the push rod 226. The rod end 212 is formed at the end of the push rod 226, and the top surface of the rod end 212 is used to form a dimple in the base of the container. The shape of the rod end 212 is similar to a truncated cone, where the end of the truncated cone includes a section 218. The section 218 of the rod end 212 may be concave, and the section 218 may be adapted to form a convex section in the base of the container that extends downward away from the center of the container. In alternative embodiments, the section 218 of the rod end 212 may be flat or convex extending upward toward the center of the container. The section 218 is used to reposition a moveable region of the base from an initially outward protruding position to a position within the container cavity, as will be discussed later in detail.

The base plug 204 includes a base mold 206 having a contact surface 208 adapted to contact a parison material during blow molding of a container. The contact surface 208 of the base mold 206 forms the shape of the base of the container. The contact surface 208 is a curvilinear mold for forming a moveable region and a bearing surface of a container base. As will be described later in detail, once the base of the bottle is formed, the moveable region of the base is repositioned from an outwardly protruding position toward the interior of the container. In one embodiment, the movable region is repositioned to a position within the interior of the container, thus forming a container base that is structurally and functionally similar to that of a container having a conventional push up.

The contact surface 208 includes a cavity 210, a surface 214, and a surface of the rod end 212. The surface of the cavity 210 and the surface of the rod end 212 form an inner region 220 of the base mold 206, and the surface 214 forms an outer region 222 of the base mold 206, with the outer region 222 being offset from the inner region 220. The inner region 220 and the outer region 222 are adapted to form a base of a container during blow molding. The outer region 222 is substantially flat and is adapted to form a bearing surface of a container. In an alternative embodiment, the outer region 222 may be non-flat or rounded, or may form a discontinuous bearing surface. The present invention can thus be adapted to form bearing surfaces with geometries known in the art.

When viewing a side cross section of the mold 206, the cavity 210 is a depression in the base mold 206 that is adapted to form a moveable region in a container. The cavity 210 begins at the outermost edge of the inner region 220, and curves both inward toward the center of the base mold 206 and downward toward the bottom of the base assembly 200. Prior to reaching the rod end 212, the cavity 210 reaches its bottom and begins to curve upward. From the bottom of the cavity 210, the cavity 210 curves both inward toward the center of the base mold 206 and upward away from the bottom of the base assembly 200. The cavity 210 ends at the truncated end of the rod end 212. In an alternative embodiment, the bottom of the rod end 212 may occur at other locations in the base mold 206 relative to the rod end 212, or may even be positioned on the rod end 212. When the base mold 206 is viewed from the top, the cavity 210 is a circular depression in the base mold 206 (see FIG. 2C). The cavity 210 is located between the outermost edge of the inner region 220 and the outermost edge of section 218 of the rod end 212. In an alternative embodiment, the cavity 210 may be any symmetric or asymmetric shape other than a circular depression. For example, the cavity may form a triangle, a rectangle, or a polygon. In a further alternative embodiment, the cavity 210 does not curve upward from its bottom, and instead may curve further downward or may be flat until it reaches the center of the base mold 206.

Figure 3A:
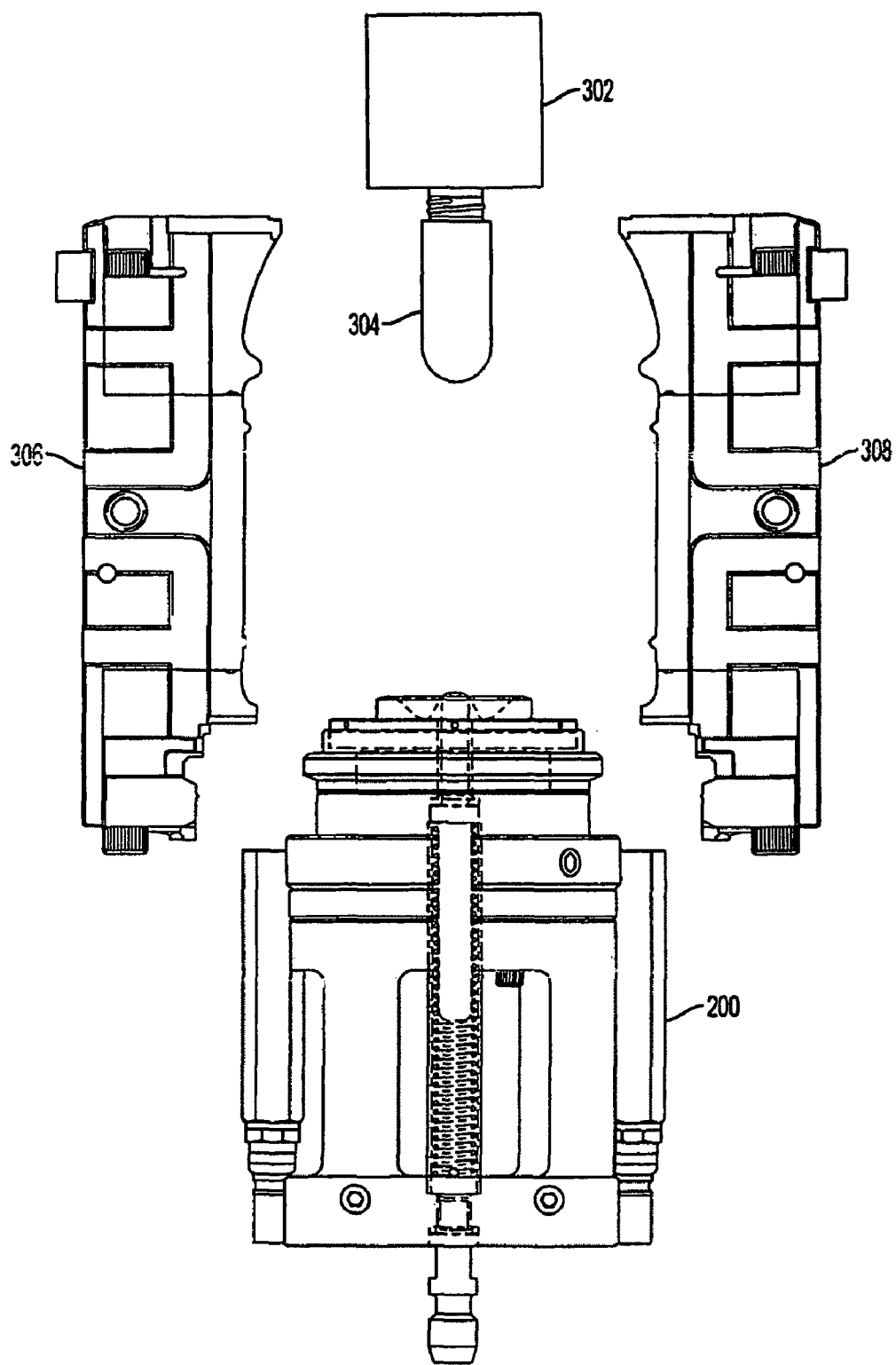
FIGS. 3A-3B illustrate an exemplary embodiment of using a base assembly to form a container base according to the present invention.
Figure 3B:
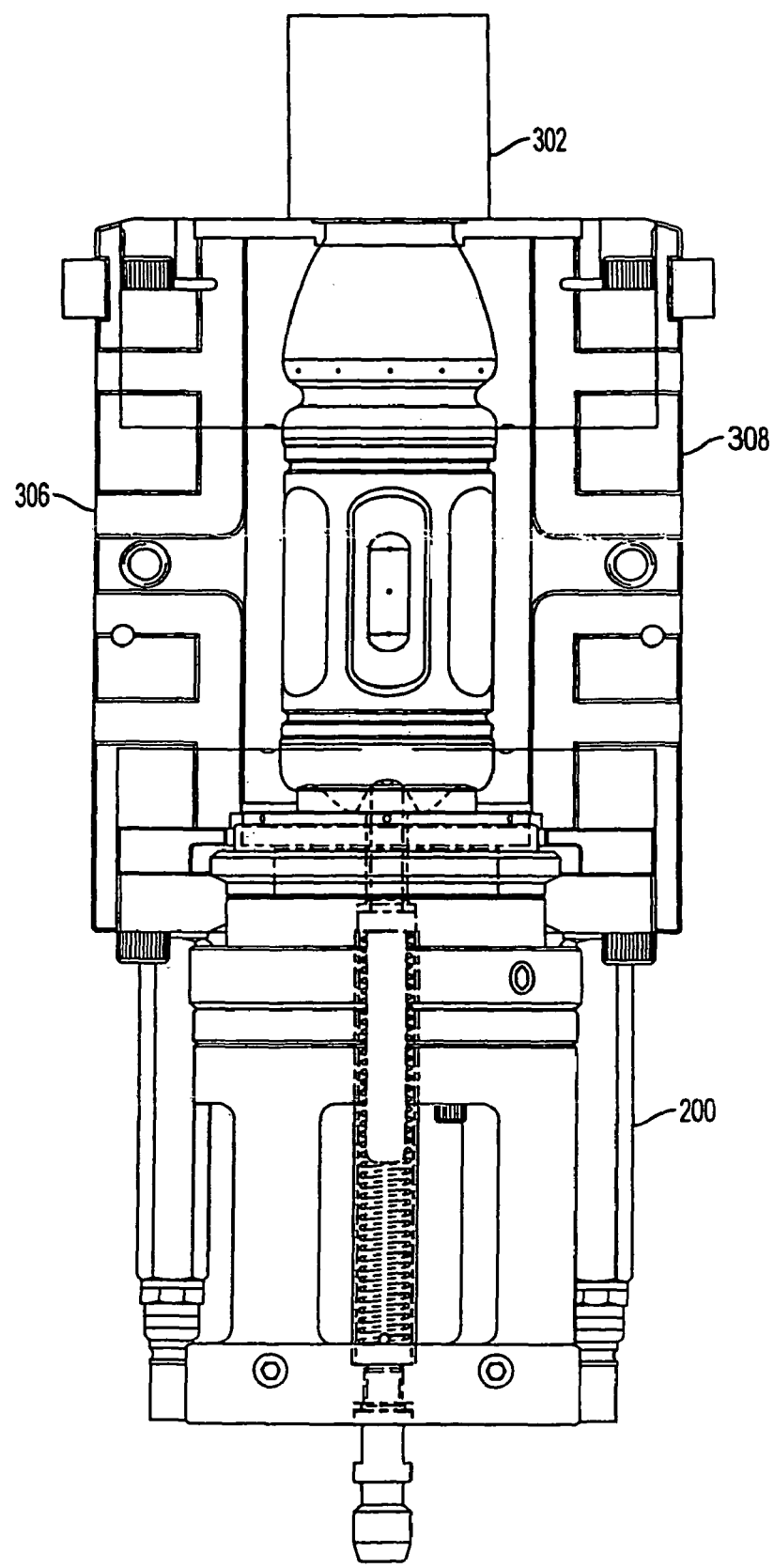

FIGS. 3A-3B illustrate an exemplary embodiment using a base assembly 200 to form a base of a container according to the present invention. In FIG. 3A, a parison 304 having a threaded finish is attached to a holder 302 of a blow molding apparatus (not shown) that is adapted to form a blow molded container. Surrounding the parison 304 is a first side mold 306, a second side mold 308, and the base assembly 200. The first side mold 306 contains a mold of one side of the container, and the second side mold 308 contains a mold of the other side. The first side mold 306 and the second side mold 308 may be mirror images of one another, or they may have different shapes. Other combinations and different numbers of molds may be used, as is understood by those of skill in the art.

Prior to blow molding, the parison 304 is enclosed by the first side mold 306, the second side mold 308, and the base mold 206. As illustrated in FIG. 3B, once the parison is enclosed, gas is forced into the parison 304 to inflate the parison 304 in the first side mold 306, the second side mold 308, and the base mold 206. During inflation, the parison 304 stretches into the form of the first side mold 306, the second side mold 308, and the base mold 206. As the parison material contacts the base mold 206, the parison material is blown against the contact surface 208 into the cavity 210. The parison material stretches into the cavity 210 to form a moveable region in the base of the container.

By having the cavity 210 in the base mold 206, the parison material does not encounter a deep protrusion, which would cause cooling and would reduce plastic material orientation. Stretching the parison material during inflation into the cavity 210, as opposed to around a protrusion, allows the parison material to further stretch and orient since the parison material is blown into a wider space as compared with a narrow recess around a deep protrusion. The additional stretch increases the crystallinity of the molecules of the parison material, which increases the rigidity of the base and improves the structural integrity of the base. Blow molding the parison material into the cavity 210 also reduces the wall thickness of the base and reduces the occurrence of thick amorphous plastic sections in the base. Thus, the amount of plastic material present in the base can be reduced without detrimentally affecting container performance, and, in some instances, this technique improves the performance of the base.

Figure 4A:
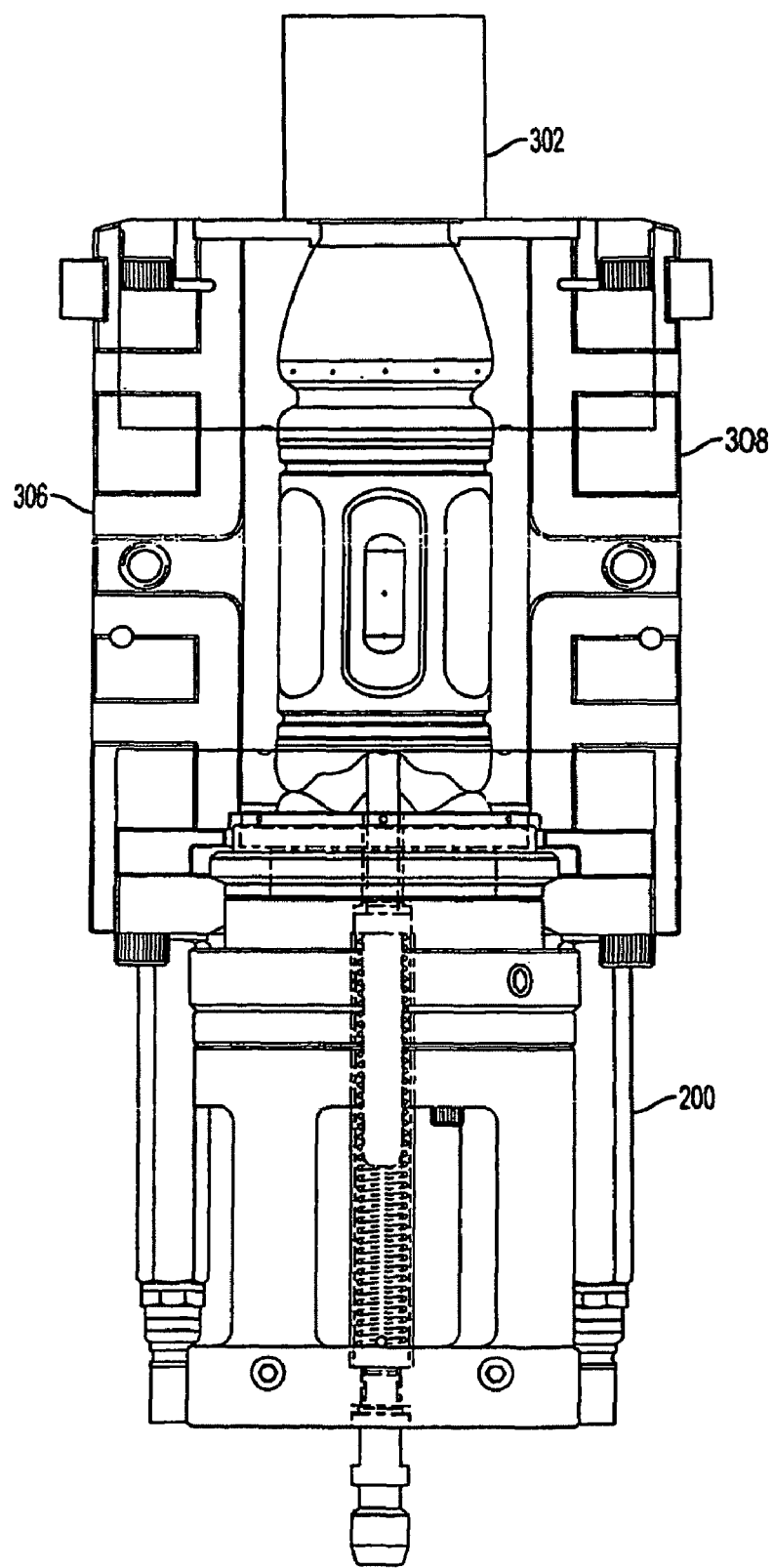
FIGS. 4A-4B illustrate exemplary embodiments of a push rod repositioning the container base according to the present invention.

FIG. 4A illustrates an exemplary embodiment of the push rod 226 repositioning the base of the container according to the present invention. In this embodiment, prior to separating the first side mold 306, the second side mold 308, and the base assembly 200 from the container, the base of the container is repositioned. After the inflation process of the parison 304 has completed, a base having a moveable region that protrudes outward from the container is formed at the cavity 210. The moveable region of the container base is downwardly convex with respect to a bearing surface, as is described below in detail. The push rod 226 is then elevated upward toward the center of the container to elevate the rod end 212 above the contact surface 208 to exert pressure on the moveable region of the base. As the rod end 212 is further elevated, the moveable region is forced upward toward the center of the container into an upward position, which extends inward into the interior of the container with respect to the bearing surface. After the moveable region is repositioned upward, the push rod 226 may be lowered. Thereafter, the first side mold 306, the second side mold 308, and the base assembly 200 may release the blow molded container by separating.

Figure 4B:
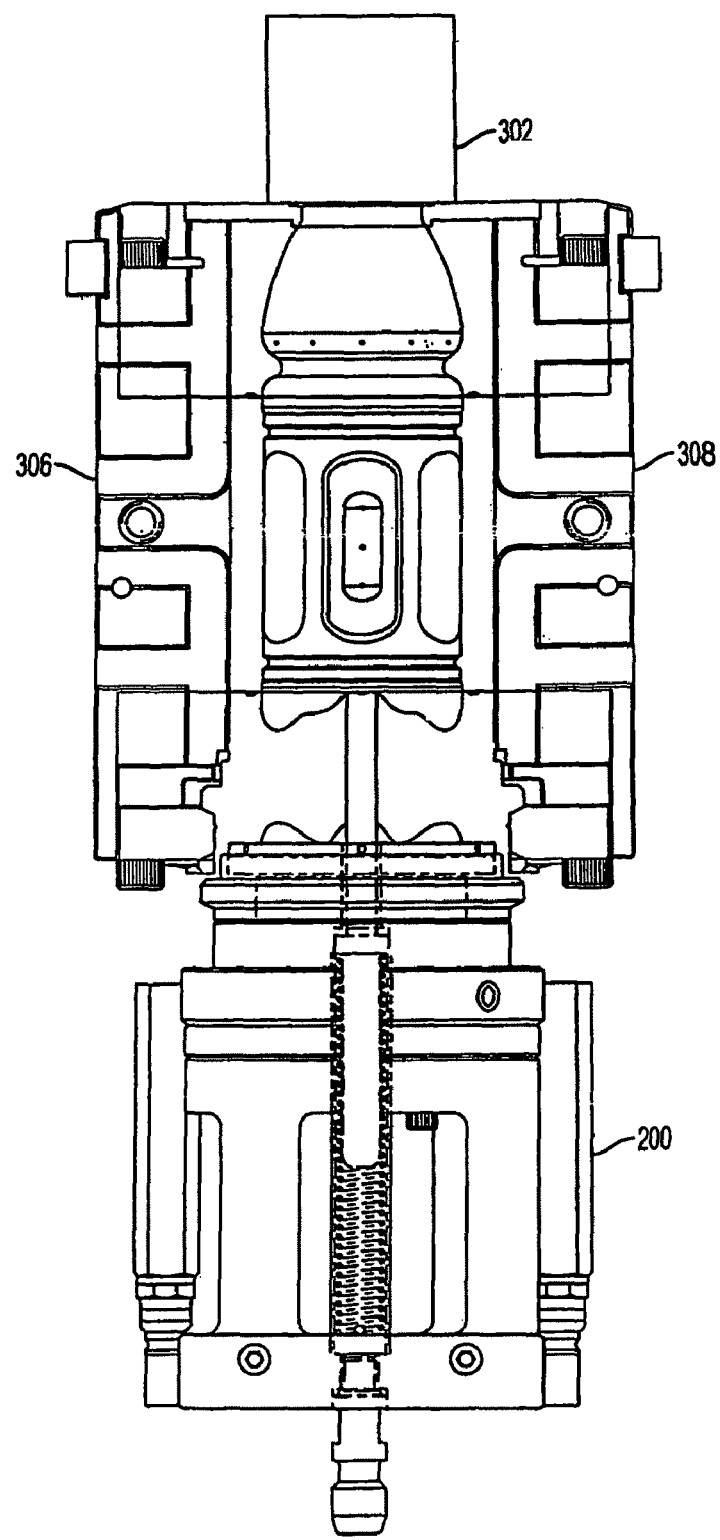

FIG. 4B illustrates an alternative exemplary embodiment of the push rod 226 repositioning the base of the container according to the present invention. In this embodiment, the base assembly 200 separates from the first side mold 306 and the second side mold 308 to release the base of the container. Afterwards, the rod end 212 is elevated until it reaches the moveable region of the container base. The rod end 212 then exerts pressure on the base of the container to reposition the moveable region of the base. Thereafter, the first side mold 306 and the second side mold 308 may release the blow molded container by separating so that the container may be further processed. In still other embodiments, the base of the container may be released from the molds without being repositioned and sent to a different device for repositioning the moveable region.

Figure 5A:
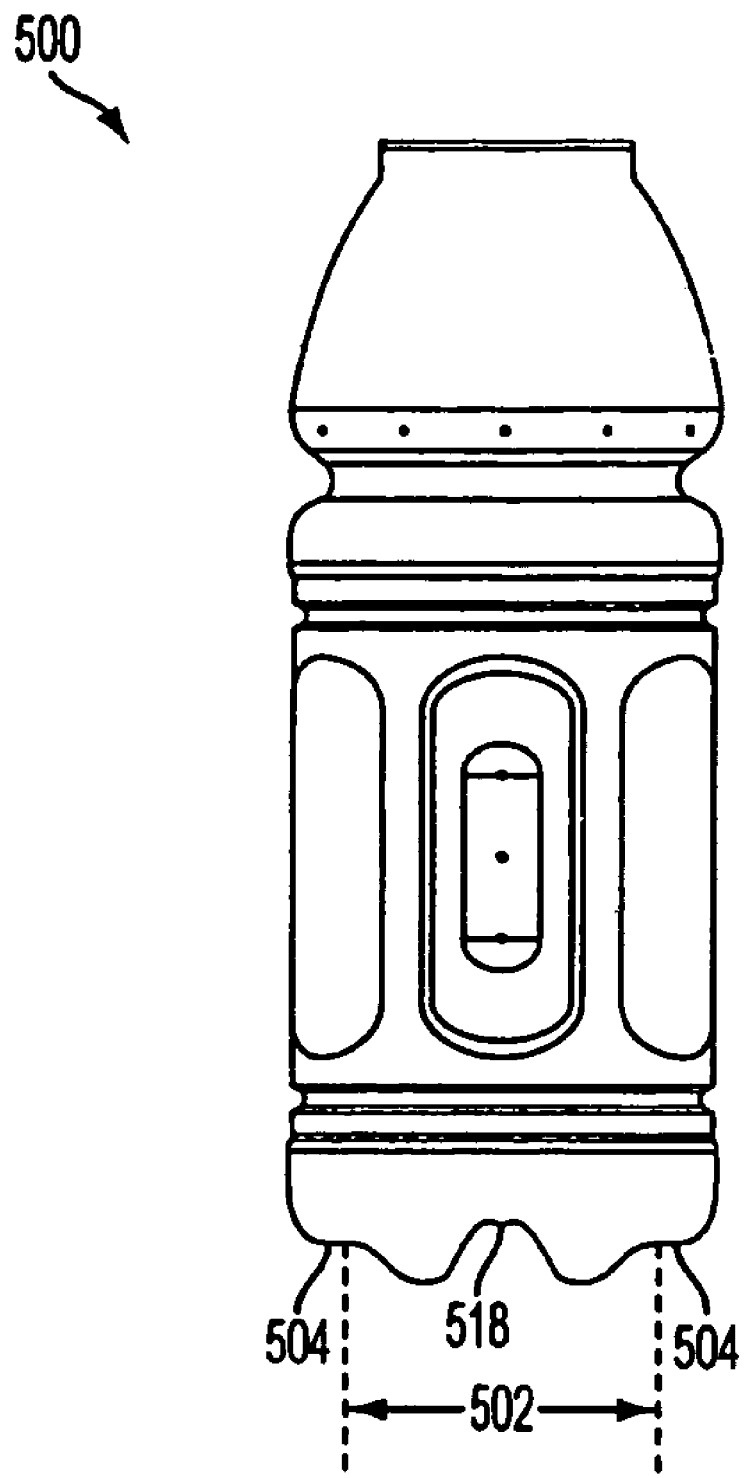
FIGS. 5A-5B illustrate an exemplary embodiment of a container prior to and after repositioning according to the present invention.
Figure 5B:
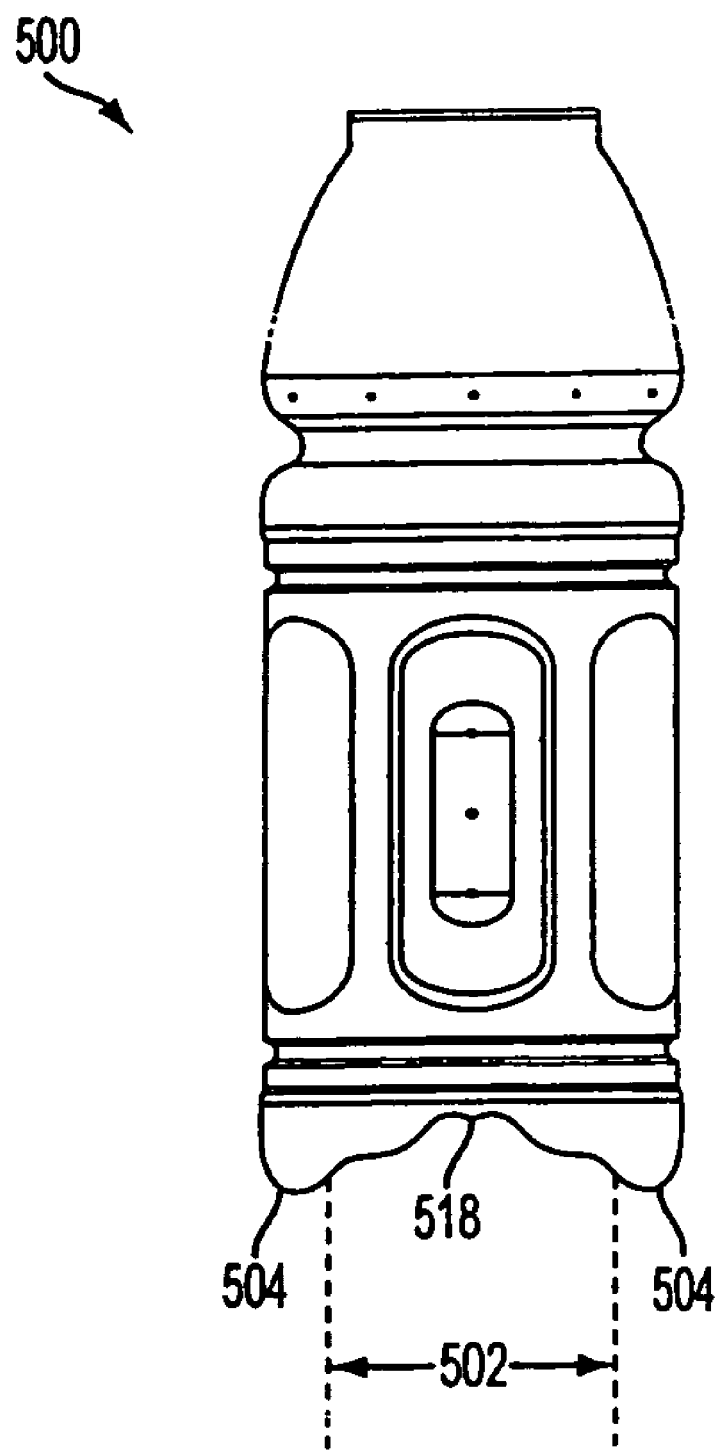

FIGS. 5A and 5B illustrate an exemplary embodiment of a container 500 prior to and after repositioning by the push rod 206 according to the present invention. Prior to repositioning, the base includes a moveable region 502 and a bearing surface 504, where at least a portion of the moveable region 502 protrudes outward from the base of the container beyond the bearing surface 504.

The moveable region 502 of the container base is downwardly convex with respect to the bearing surface 504. During inflation using base mold 206, the moveable region 502 is formed by the inner region 220 of the base mold 206, and the bearing surface 504 is formed by the outer region 222. The moveable region 502 protrudes outward from an innermost edge of the bearing surface 504 away from the center of the container and is downwardly convex with respect to the bearing surface 504. The moveable region 502 is illustrated as being circular, but may be any symmetrical or asymmetrical shape. A dimple 518 is formed at a center of the moveable region 502 by the surface of the rod end 212 of the contact surface 208. The dimple 518 is upwardly convex and protrudes inward toward the center of the container 500. The dimple 518 provides a pocket in which the rod end 212 can be situated as the push rod 226 extends to reposition the moveable region 502 of the base.

During repositioning, the moveable region 502 is moved toward the center interior of the container by the extension of the rod end 212. In one embodiment, the moveable region 502 is moved within the interior of the container with respect to the bearing surface 504. In repositioning, the rod end 212 contacts the dimple 518 and forces the dimple 518 toward the center of the container. This repositions the moveable region 502 and causes the moveable region 502 to no longer extend or protrude beyond the bearing surface 504. In an alternative embodiment, the rod end 212 may contact the moveable region 502 at other locations to reposition the moveable region 502 of the base, as would be understood by those of ordinary skill in the art. In one embodiment, repositioning of the base occurs before the container is filled so that the container may be placed on a substantially flat surface for transport to, for example, a filling machine, or alternatively, for transport during manufacturing or for palletizing, as is known in the art. The filling machine may fill the container by any known filling process, including hot filling, cold filling, and other filling processes known by those skilled in the art. By repositioning the moveable region 502, the container can stand stably on a substantially flat surface and be processed similar to containers with conventionally manufactured push up bases. Thus, the base region, after repositioning the moveable region 502, has the appearance and functionality of a conventional blow molded base with a push up, without the disadvantages of the prior art.

The container 500 has a one-piece construction and can be prepared from a monolayer plastic material, such as a polyamide, for example, nylon; a polyolefin such as polyethylene, for example, low density polyethylene (LDPE) or high density polyethylene (HDPE), or polypropylene; a polyester, for example polyethylene terephthalate (PET), polyethylene naphtalate (PEN); or others, which can also include additives to vary the physical or chemical properties of the material. For example, some plastic resins can be modified to improve the oxygen permeability. Alternatively, the container 500 can be prepared from a multilayer plastic material. The layers can be any plastic material, including virgin, recycled and reground material, and can include plastics or other materials with additives to improve physical properties of the container. In addition to the above-mentioned materials, other materials often used in multilayer plastic containers include, for example, ethylvinyl alcohol (EVOH) and tie layers or binders to hold together materials that are subject to delamination when used in adjacent layers. A coating may be applied over the monolayer or multilayer material, for example to introduce oxygen barrier properties.

Although the present embodiment and the figures illustrated the parison 304 as a preform having threads at the top, the parison may also be a threadless plastic tube without departing from the scope of the invention. One example using a parison that is a plastic tube involves inserting a needle into the parison, and forcing gas through the needle to expand the plastic tube to take the shape of a mold. Additionally, any blow molding technique may be used for forming the container, including injection blow molding, stretch blow molding, or extrusion blow molding, as would be understood by those of skill in the art.

It is noted that the detailed description describes a technique for blow molding a moveable region 502 on a container base by molding a parison material into a cavity 210. However, this technique may be used to form other regions of a container other than the base, such as to form at least a portion of a hand grip of a container, or to form other deep protrusions of a container. The cavity 210 may also be located on either side mold 306 or 308, or on other locations in the base mold 206. This technique is useable on any region of a plastic container where a deep protrusion is required. The technique described herein increases the rigidity of a region having a deep protrusion, while reducing thick amorphous plastic sections around the region caused by the deep protrusion.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A method for forming a blow molded container with a base having a moveable region and a bearing surface, the method comprising:
    receiving a parison;
    enclosing said parison with a mold that includes a cavity;
    inflating said parison, while enclosed in said mold, to form said blow molded container with said moveable region at said cavity; and
    after said inflating has been completed, starting repositioning of said moveable region before filling said blow molded container,
    wherein, before said repositioning, at least a first portion of said moveable region of said blow molded container is arranged outwardly below a lower-most extremity of said bearing surface, and at least a second portion of said moveable region of said blow molded container is arranged inwardly above said lower-most extremity of said bearing surface,
    wherein the second portion of said moveable region arranged inwardly above said lower-most extremity of said bearing surface is located at the center of the moveable region of said blow molded container, and
    wherein the first portion of said moveable region arranged outwardly below said lower-most extremity of said bearing surface surrounds the second portion of said moveable region.

2. The method according to claim 1,
    wherein said mold further comprises: a first side mold; a second side mold; and a base mold, and the method further comprising:
    separating said first side mold and said second side mold from said blow molded container; and
    separating said base mold from said blow molded container.

3. The method according to claim 2, wherein said repositioning occurs before said separating said base mold.

4. The method according to claim 1, wherein said repositioning includes moving said movable region toward the interior of said blow molded container.

5. The method according to claim 1, wherein said repositioning moves said at least a first portion of said movable region to a position within the interior of said blow molded container.

6. The method according to claim 1, wherein said repositioning occurs when said blow molded container is substantially cool.

7. The method according to claim 1, wherein said repositioning reduces an internal volume of the blow molded container.

8. The method according to claim 1, wherein said lowest point of said bearing surface remains at substantially a same horizontal plane prior to and after said repositioning.

9. The method according to claim 1, wherein said repositioning causes said moveable region to no longer extend beyond the bearing surface, permitting the container to stand stably with its bearing surface on a substantially flat surface.

10. The method according to claim 1, wherein the bearing surface is a discontinuous surface.

11. The method according to claim 1, wherein the base mold is a multi-piece mold comprised of first and second faces, the first face forming the first portion of the moveable region and the second face forming the second portion of the moveable region, the second face being configured to move upward to perform said repositioning of said moveable region.

12. A method comprising:
inflating a parison to form a blow molded container having a moveable region, an opening at a top end of the container and a bearing surface at a bottom end of said container opposite said top end; and
initiating repositioning of said moveable region of said formed blow molded container after completion of said inflating and before filling said blow molded container,
wherein, before said repositioning, at least a first portion of said moveable region of said blow molded container is arranged outwardly below a lowest point of said bearing surface, and at least a second portion of said moveable region of said blow molded container is arranged inwardly above said lowest point of said bearing surface,
wherein the second portion of said moveable region arranged inwardly above said lowest point of said bearing surface is located at the center of the moveable region of said blow molded container, and
wherein the first portion of said moveable region arranged outwardly below said lowest point of said bearing surface surrounds the second portion of said moveable region.

13. The method according to claim 12, wherein said repositioning occurs when said blow molded container is substantially cool.

14. The method according to claim 12, wherein said repositioning reduces an internal volume of the blow molded container.

15. The method according to claim 12, wherein said lowest point of said bearing surface remains at substantially a same horizontal plane prior to and after said repositioning.

16. The method according to claim 12, wherein said repositioning causes the moveable region to no longer extend beyond the bearing surface, permitting the container to stand stably with its bearing surface on a substantially flat surface.

17. The method according to claim 12, wherein the bearing surface is a discontinuous surface.

18. The method according to claim 12, wherein said repositioning of said moveable region is performed by an actuator applying an upward force to only the second portion of the moveable region and not the first portion the moveable region.

* * * * *